Dec. 17, 1940. C. A. OVERGUARD 2,225,507
PIPE THREADING APPARATUS
Filed March 20, 1939 2 Sheets-Sheet 1

INVENTOR.
Christian A. Overguard
Frank M. Sl...
BY
ATTORNEY.

Dec. 17, 1940.   C. A. OVERGUARD   2,225,507
PIPE THREADING APPARATUS
Filed March 20, 1939   2 Sheets-Sheet 2

INVENTOR.
Christian A. Overguard
BY
His ATTORNEY.

Patented Dec. 17, 1940

2,225,507

UNITED STATES PATENT OFFICE 2,225,507

PIPE THREADING APPARATUS

Christian A. Overguard, Avon, Ohio, assignor of one-half to Edwin Swanson, Elyria, Ohio Application March 20, 1939, Serial No. 262,913

4 Claims. (Cl. 10—120.5)

My invention relates to apparatus for threading pipes, rods, and the like, and relates more particularly to apparatus of this type having improved means for adjusting the apparatus to accommodate different size pipes.

Certain apparatus of the prior art with which I am familiar have been provided with drive plates and change plates, and various other adjustment means, to accommodate different size pipes. In certain of the other apparatus with which I am familiar the chasers have been made removable and other chasers substituted therefor in order to adjust the apparatus for different size pipes.

My invention involves an adjustable poster type die in which the drive plate and the change plate of the prior art structures are eliminated and but one set of chasers are used.

It is an object of my invention to provide improved pipe threading apparatus.

It is a further object of my invention to provide an improved pipe threading apparatus of the adjustable poster type.

Another object of my invention is to provide improved chaser means whereby different size pipes may be accommodated.

Another object of my invention is to provide improved adjustment means to effect the purposes aforesaid.

A further object of my invention is to provide improved means for securing and adjusting the chasers to take care of pipes of different sizes.

A further object of my invention is to provide apparatus which will be simple in construction, effective and economical in use.

Other objects of my invention and the invention itself will become increasingly apparent from a consideration of the following description of the drawings, wherein.

Figure 1:
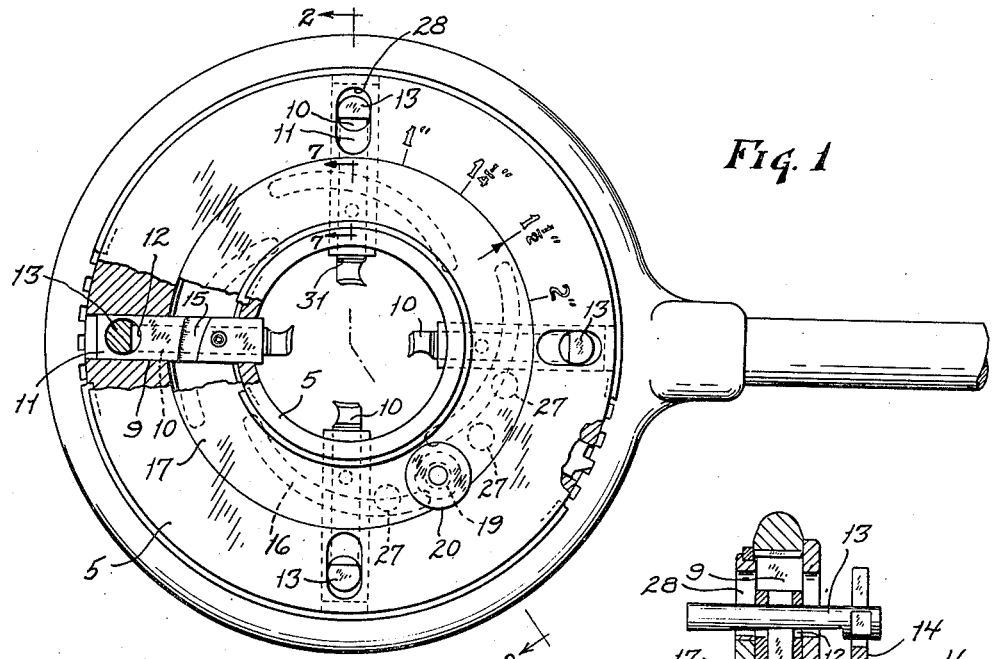
Fig. 1 is a front elevational view of the pipe threading apparatus embodied in my invention.

Referring now to the drawings, I have indicated generally at 1 a work-holder or die housing of generally tubular form, having a bore 2 at its forward end terminating in a radially extending shoulder 3 joining a threaded portion 4 of reduced diameter, forming the lead thread for the die head 5. The work holder or die housing 1 is further provided with vent holes 6—6 and a felt or the like washer 7 adjacent its forward end. The die head 5 is likewise provided with a felt or the like washer 8 at its rearward end to seal the same against the ingress of chips or other foreign materials.

For a further description of the preferred form of work-holder which I employ in connection with the apparatus of the present invention, attention is directed to Letters Patent No. 2,126,343, dated August 9, 1938, issued to the present inventor, wherein is shown and described a work-holder of the type preferred. However, other forms of work-holders might be employed in connection with the present invention. The manner of holding the work constitutes no essential part of the invention herein, and any well known means may be employed whereby the work is projected into the work-holder any desired amount, and rigidly supported in axial alignment with the die-holder and thread chasers of the present invention.

It is customary to rigidly support the work-holder upon the bed of the machine by any suitable means, and rotate the die head, but it is understood that my invention is equally applicable if the die head and thread chasers are rigidly supported and the work-holder and work are rotated.

Telescoped within the work-holder 1 is the generally tubular die head 5, provided with a plurality of radial guideways 9 adjacent the forward end of the die to receive thread chasers and thread chaser cages, generally indicated at 10 and 11. The thread chasers 10 are preferably of square form in cross section, and are longitudinally movable in a manner hereinafter to be described, within the chaser cages 11. The chaser cages 11 are generally telescoped over the chasers 10 and are provided with cylindrical openings 12 to receive the posts 13, four of which, in the present embodiment of my invention, are used, although any preferred number of posts may be employed. The posts 13 in my invention are radially slidably mounted on a post plate 14 which, in turn, is rotatively mounted on the threaded portion 4 of the work holder 1. The die head is provided with radial slots 28 through which the posts project.

The chaser cages 11 are provided with generally arcuate grooves or slots 15 in which projections 16 carried on the under side of the index plate 17 are adapted to move when the index plate is rotated, thus effecting radial movement of the chaser cages 11. To prevent their disengagement, the chasers 10 are each engaged by snap balls 18 carried in a perforation 29 in the chaser cages 11 and project slightly into an indentation 30 in the chasers whereby upon movement of the die head relative to the work holder, the chasers 10 can follow the taper of their associated posts 13, thus giving the thread being cut the necessary taper and not being bound by the shifted and radial position of the cages 11 which is provided to allow the chasers to assume various positions as indicated in Fig. 1 herein, whereby different size pipes, rods or the like can be accommodated. Thus, although the chasers 10 are carried by the chaser cages 11 and with them assume the various adjusted positions as determined by the index plate 17, a slight relative longitudinal movement, as controlled by the tapered posts, is allowed.

A slot 31 is provided in each chaser in which a screw driver, for example, may be inserted to withdraw them for replacement or repair purposes.

Figure 2:
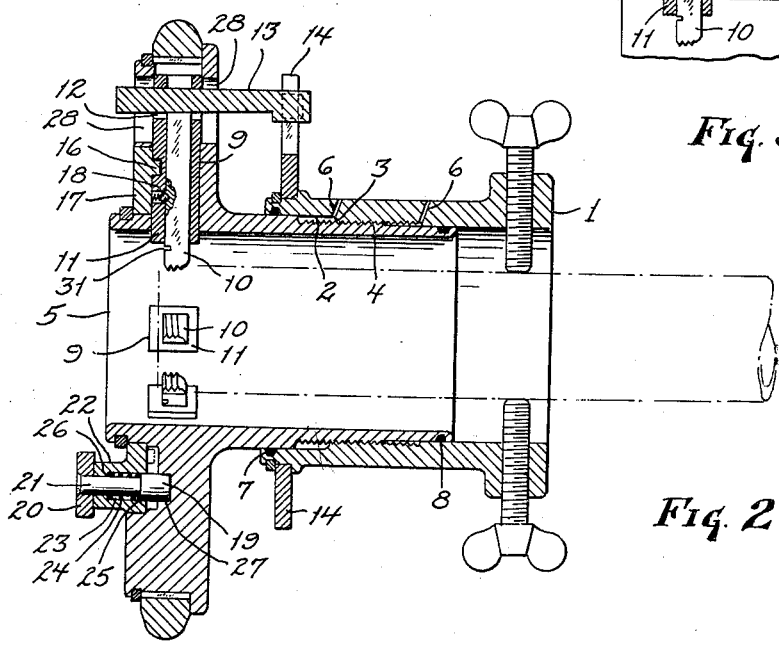
Fig. 2 is a view taken on the line 2—2 of Fig. 1.
Figure 4:
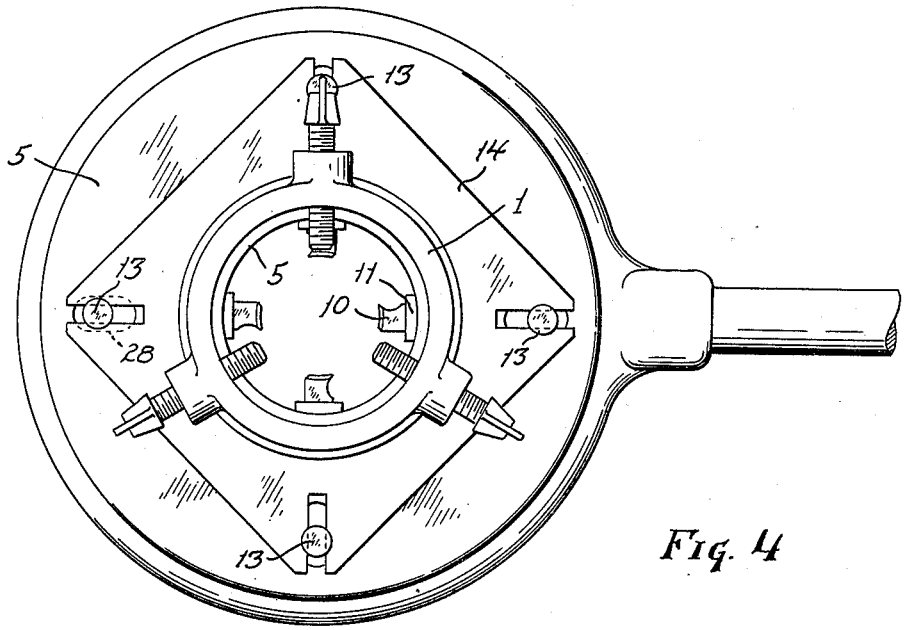
Fig. 4 is a rear elevational view of the pipe threading apparatus of my invention.
Figure 5:
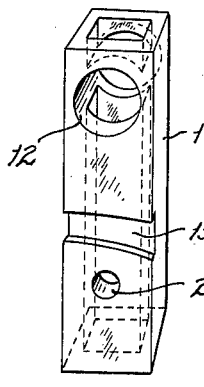
Fig. 5 is a perspective view of the chaser cage embodied in my invention.
Figure 6:
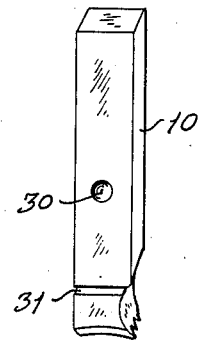
Fig. 6 is a perspective view of the chaser used in my invention.
Figure 7:
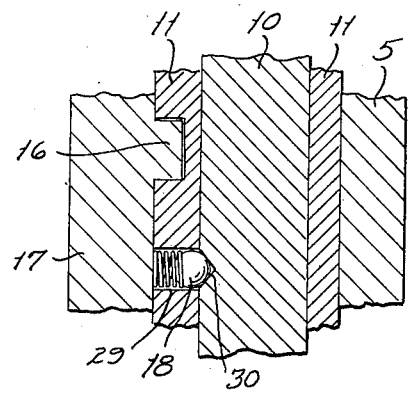
Fig. 7 is an enlarged fragmentary view taken from the line 7—7 of Fig. 1.

To effect the rotation of the index plate and radial shifting of the chaser cages and chasers, I provide an index plate locating plug 19 shown herein in Figs. 1 and 2 which is provided with a knob 20 and a stem 21 which is projected within an extension 22 of the index plate 17 which is perforated at 23 to receive a spring 24 which bears against a shoulder 25 provided on the lower portion of the stem 21 and a shoulder 26 provided on the extension 22. Thus, the plug 19 is moved into any of the locating plug holes 27 located in the die head.

In operation, the die head is rotated to its extreme outward position, the work holder is telescoped on the pipe to a point where the end of the pipe meets the thread chasers, the clamps on the work holder are tightened to rigidly hold the pipe or work therebetween, and the index plate locating plug is moved into whichever of the locating plug holes will accommodate the particular size work. The die head is then rotated and as the die head moves inwardly, the chasers will perform threading operation upon the pipe, the posts proceeding outwardly through the perforations 12 and 28 until the farthest position, such as is shown in Fig. 3, is reached.

Figure 3:
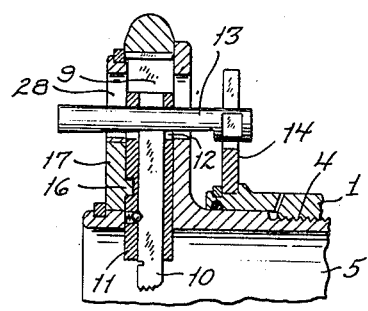
Fig. 3 is a fragmentary sectional view showing parts of Fig. 2 in different positions.

It will be noted that in Fig. 3, the die has been shown adjusted to accommodate a size pipe different than that in Fig. 2. Further, that the projection 16 on the index plate 17 is here holding the chaser cage at a lower position and this, in turn, has moved the post 13 along with it, which forces the chaser itself to a lower position to operate on a work piece of smaller diameter. It will also be noted that in Fig. 3 the parts are in the position they will assume at the end of a threading operation. The die head has progressed to its extreme position on the threads 4 and the thread chaser has moved up the taper on the post 13, thus producing a tapered thread on the work piece.

In the event that it is not desired to cut a tapered thread on the work, the thread chasers and their associated chaser cages may be maintained fixed against radial movement when a cylindrical thread is desired.

Although I have shown and described a preferred embodiment of my invention, I contemplate that numerous and extensive departures may be made therefrom without departing from the spirit of my invention and the scope of the appended claims.

Having thus described my invention what I claim is:

1. In a threading apparatus, the combination of a work holder for rigidly supporting the elements to be threaded, a plate rotatably mounted on said work holder and having a plurality of spaced radially extending slots, a rotatable die head threadingly engaging the work holder and having a plurality of spaced radially extending slots therein, a plurality of spaced chasers mounted for radial movement in said die head, a plurality of spaced posts, each having a rear portion mounted upon said plate and being radially movable in one of the plate slots, a forward portion extending through and being radially movably in one of the slots in said die head and an intermediate portion engaging the outer edge of one of said chasers, means associated with said die head for moving said chasers and said posts in a radial direction to a predetermined position, and means whereby relative axial movement may be effected between the die head and work holder to cut threads on said element and to move said posts forwardly, said posts being tapered to permit limited radial movement of said chasers during the thread cutting operation, whereby tapered threads may be formed.

2. In a threading apparatus, the combination of a work holder for rigidly supporting the elements to be threaded, a plate rotatably mounted on said work holder and having a plurality of radially extending slots, a rotatable die head threadingly engaging the work holder and having a plurality of spaced radially extending slots therein, a plurality of spaced chasers mounted for radial movement in said die head, a plurality of spaced posts, each having a rear portion mounted upon said plate and being radially movable in one of the plate slots, a forward portion extending through and being radially movable in one of the slots in said die head, and an intermediate portion engaging the outer edge of one of said chasers, means associated with said die head for simultaneously moving said chasers and said posts in a radial direction to a predetermined position, and means whereby relative axial movement may be effected between the die head and work holder to cut threads on said element and move said posts forwardly, each of said posts being tapered outwardly from its forward to its rear portion to permit limited radial movement of said chasers during the thread cutting operation, whereby tapered threads may be formed.

3. In a threading apparatus, the combination of a work holder for rigidly supporting the elements to be threaded, a plate having a plurality of spaced radially extending slots rotatably mounted on said work holder, a rotatable die head threadingly engaging the work holder and having a plurality of radially extending slots therein, a plurality of cages mounted in said die head, each of which is provided with an aperture, a chaser mounted in each of said cages and having limited longitudinal movement with respect thereto, a plurality of spaced posts, each having a rear portion mounted upon said plate and being radially movable in one of the plate slots, a forward portion extending through one of the slots in said die head, and an intermediate portion extending through the aperture in said cage and bearing against the outer edge of one of said chasers, means associated with said die head for simultaneously moving said chasers and said posts radially to a predetermined position, and means whereby relative axial movement may be effected between the die head and work holder to cut threads on said elements and to move said posts forwardly, said posts being tapered outwardly from their forward to rear portions to permit limited radial outward movement of said chasers during the cutting operation, whereby tapered threads may be formed.

4. In a threading apparatus, the combination of a work holder for rigidly supporting the elements to be threaded, means rotatably mounted on said work holder and having a plurality of spaced radially extending slots therein, a plurality of spaced chasers mounted for radial movement in said means, a plurality of spaced posts, each being mounted upon said work holder and being radially movable in one of the said slots, an intermediate portion of said post engaging the outer edge of one of said chasers, means whereby said chasers and said posts are moved in a radial direction to a predetermined position and means whereby relative axial movement may be effected between the rotatable mounting means carrying said slots and the work holder to cut threads on an element and to move said posts forwardly, said posts being tapered to permit limited radial movement of said chasers during the operation whereby tapered threads may be formed.

CHRISTIAN A. OVERGUARD.